C. V. ROBERTS & J. W. BUTLER.
GAS BURNER.
APPLICATION FILED SEPT. 18, 1913.
1,138,416. Patented May 4, 1915.
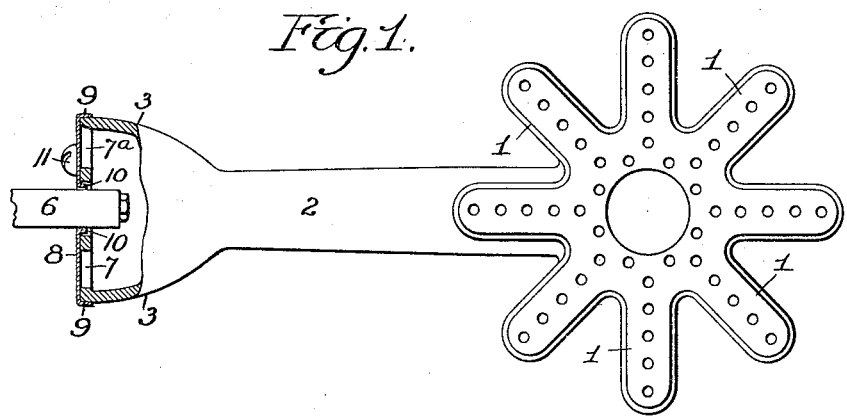
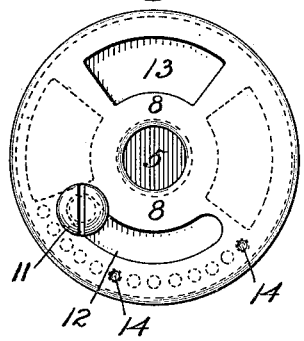
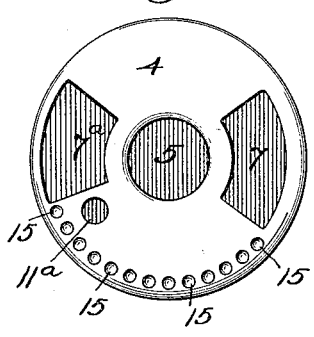
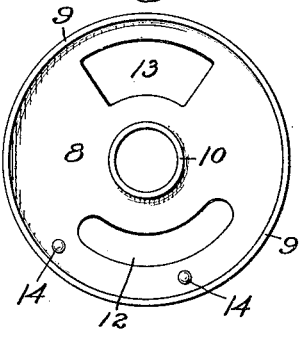
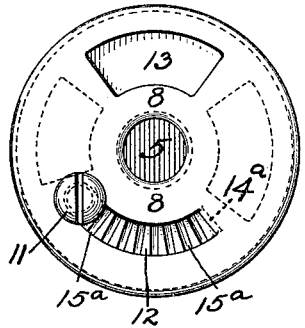
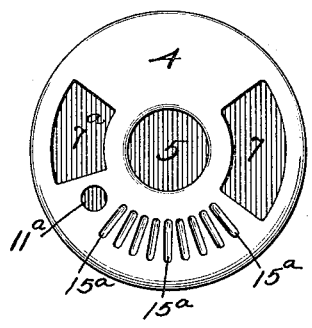
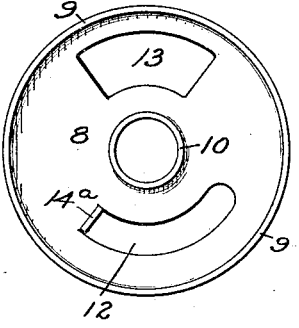
Witnesses
Inventors
Clarence V. Roberts & James W. Butler
by their Attorney

UNITED STATES PATENT OFFICE.

CLARENCE V. ROBERTS AND JAMES W. BUTLER, OF PHILADELPHIA, PENNSYLVANIA, ASSIGNORS TO ROBERTS & MANDER STOVE COMPANY, OF PHILADELPHIA, PENNSYLVANIA, A CORPORATION OF PENNSYLVANIA.

GAS-BURNER.

1,138,416.  Specification of Letters Patent.  Patented May 4, 1915.

Application filed September 18, 1913. Serial No. 790,393.

*To all whom it may concern:*

Be it known that we, CLARENCE V. ROBERTS and JAMES W. BUTLER, both citizens of the United States, residing in Philadelphia, Pennsylvania, have invented certain Improvements in Gas-Burners, of which the following is a specification.

Our invention has reference particularly to a mixing tube for that class of gas burners in which atmospheric air is mixed with the gas before the latter reaches the point of combustion. In burners of this class it is customary to provide the mixer tube with a rotatable shutter having one or more openings adapted to coincide with a corresponding opening or openings in the end of the mixer tube, this shutter being adjustable so that the amount of atmospheric air admitted may be increased or diminished as the quality or quantity of the gas may require. It is also customary to retain the shutter in any adjusted position by means of a set screw or other locking device, the shank of which passes through a slot in the shutter.

Our invention has for its object the provision of simple and efficient means for holding the shutter in position, this means being of such a character that any desired adjustment of the shutter may be effected without removing the retaining screw and no change in position of the shutter being possible should the retaining screw accidentally become slightly loosened. This object we attain in the manner hereinafter set forth, reference being had to the accompanying drawing, in which—

Figure 1 is a plan view of a gas burner constructed in accordance with our invention, the shutter and part of the mixing tube being shown in horizontal section; Fig. 2 is an end view of the mixing tube with the shutter thereon; Fig. 3 is an end view of the mixing tube without the shutter; Fig. 4 is a rear view of the shutter; Fig. 5 is an end view of a mixing tube and shutter embodying a modification of our invention; Fig. 6 is a view of the modified form of mixing tube shown in Fig. 5 but with the shutter removed, and Fig. 7 is a rear view of the shutter shown in Fig. 5.

In the drawing, 1 represents a burner having a mixing tube 2 which is provided with an enlarged shell 3 containing the mixing chamber, the end 4 of said shell having a central opening 5 for the reception of a gas supply pipe or gas cock 6 and one or more segmental openings 7 for the admission of air.

Mounted upon the end 4 of the shell is a shutter 8, which is provided with inwardly projecting flanges 9 and 10. The flange 9 overlaps the end of the shell 3 and the flange 10 embraces the gas supply pipe 6 and projects through the opening 5 in the end 4, these flanges serving to maintain the shutter in proper concentric relation to the shell.

The shutter 8 is held in position against the end of the shell by means of a retaining screw 11, the shank of which passes through a segmental slot 12 in said shutter, and is screwed into a threaded opening $11^a$ in the end of the shell (Figs. 3 and 6). The shutter 8 is also provided with a segmental opening 13 which is adapted to more or less completely register with the opening 7 in the end of the shell 3. By means of the greater or less uncovering of the opening 7 the amount of atmospheric air admitted into the mixing chamber for admixture with the gas from the pipe 6 is regulated. The registry of the slot 12 with the opening $7^a$ may also be relied upon to furnish an additional supply of air if required.

In the device as thus far described any accidental loosening of the retaining screw would result in a liability of the shutter being moved, consequently changing the area of the opening or openings through which air is admitted. In order to prevent this we provide upon the inner face of the shutter 8 one or more studs 14 which are adapted to engage one or more of a series of corresponding notches 15 in the end of the shell. One stud 14 would answer the purpose, but in the drawing we have shown two, as that form gives greater firmness and stability. With this construction, when it is desired to change the relation of the parts, the retaining screw 11 is loosened sufficiently to allow the shutter 8 to be drawn away from the end of the shell until the studs 14 are removed from engagement with the notches 15, when the shutter may be turned to the desired position, the studs 14 brought into engagement with the notches 15 with which they then register and the retaining screw 11 tightened. The studs and notches are of such size that mere accidental loosening of the retaining screw will not allow sufficient play of the shutter 8 to permit disengagement.

In Figs. 5, 6 and 7 we have shown a modification of our invention in which, in place of the rounded studs 14, an oblong stud 14ᵃ is formed at the end of the slot 12 and a series of radial notches 15ᵃ are provided in the end of the shell for coöperation with this stud.

We do not limit ourselves to the particular form and positioning of the parts shown in the drawing, and it is, of course, obvious that the studs 14 might be on the end 4 of the shell and the notches 15ᵃ in the shutter 8 without departing from our invention.

We claim:

A mixer of the class described embodying a shell with partly closed end, a rotative shutter bearing against said end of the shell for controlling inflow of air thereto, means for retaining the shutter in its proper relation to the end of the shell, and locking means separate from the retaining means and comprising a projecting stud and a segmentally disposed series of notches for engaging said stud, one of said retaining elements being formed on the end closure of the shell and the other upon that part of the shutter corresponding thereto.

In testimony whereof we have signed our names to this specification, in the presence of two subscribing witnesses.

CLARENCE V. ROBERTS.
JAMES W. BUTLER.

Witnesses:
ELSIE FULLERTON,
HAMILTON D. TURNER.

Copies of this patent may be obtained for five cents each, by addressing the "Commissioner of Patents, Washington, D. C."